(12) United States Patent
Kim et al.

(10) Patent No.: US 10,535,475 B2
(45) Date of Patent: Jan. 14, 2020

(54) ELECTRIC/ELECTRONIC DEVICE AND MANUFACTURING METHOD THEREOF

(71) Applicant: FOUNDATION OF SOONGSIL UNIVERSITY INDUSTRY COOPERATION, Seoul (KR)

(72) Inventors: Joo Yong Kim, Seoul (KR); Min Ki Choi, Incheon (KR)

(73) Assignee: FOUNDATION OF SOONGSIL UNIVERSITY INDUSTRY COOPERATION, Seoul (KR)

( * ) Notice: Subject to any disclaimer, the term of this patent is extended or adjusted under 35 U.S.C. 154(b) by 77 days.

(21) Appl. No.: 15/339,569

(22) Filed: Oct. 31, 2016

(65) Prior Publication Data

US 2017/0169961 A1    Jun. 15, 2017

(30) Foreign Application Priority Data

Dec. 9, 2015    (KR) .......................... 10-2015-0174837

(51) Int. Cl.
*H01G 11/00* (2013.01)
*H01G 11/66* (2013.01)
(Continued)

(52) U.S. Cl.
CPC ............. *H01G 11/66* (2013.01); *H01G 11/58* (2013.01); *H01G 11/86* (2013.01)

(58) Field of Classification Search
CPC .......... H01G 9/00; H01M 10/00; H01M 4/00; Y02E 10/00; Y02E 60/00
See application file for complete search history.

(56) References Cited

U.S. PATENT DOCUMENTS

| 4,514,579 A | * | 4/1985 | Hanak | ............... | H01L 31/03921 |
| | | | | | 136/244 |
| 2004/0161663 A1 | * | 8/2004 | Nishide | ................. | H01M 2/204 |
| | | | | | 429/152 |

(Continued)

FOREIGN PATENT DOCUMENTS

| JP | 2012-119189 | * | 6/2012 |
| JP | 5212470 B2 | | 6/2013 |

OTHER PUBLICATIONS

JP2012119189 A Google Patents.*

*Primary Examiner* — David P Turocy
*Assistant Examiner* — Mohammad Mayy
(74) *Attorney, Agent, or Firm* — Hauptman Ham, LLP

(57) ABSTRACT

A continuous electric/electronic device and a method of manufacturing the same are disclosed. The method of manufacturing a continuous electric/electronic device having a serial connection structure comprises (a) disposing a first electrode current collection unit, (b) disposing first organic•inorganic material in regard to the first electrode current collection unit, (c) laminating a first area of a second electrode current collection unit on the disposed first organic•inorganic material, (d) disposing second organic•inorganic material in regard to a second area of the second electrode current collection unit and (e) laminating a third electrode current collection unit on the disposed second organic•inorganic material. Here, the first area and the second area of the second electrode current collection unit operate as current collection units having different polarity in regard to adjoining first organic•inorganic material and second organic•inorganic material.

6 Claims, 6 Drawing Sheets

(51) Int. Cl.
*H01G 11/58* (2013.01)
*H01G 11/86* (2013.01)

(56) References Cited

U.S. PATENT DOCUMENTS

| | | | |
|---|---|---|---|
| 2006/0153974 A1* | 7/2006 | Matsuzaki | H01M 4/8885 427/115 |
| 2011/0177370 A1* | 7/2011 | Kawamoto | H01M 4/667 429/94 |
| 2012/0021268 A1* | 1/2012 | Mailley | H01M 2/021 429/94 |
| 2014/0182652 A1* | 7/2014 | Song | H01G 9/2068 136/244 |

* cited by examiner (a)
Flexible dye-sensitized solar cell (b)
Flexible battery

ELECTRIC/ELECTRONIC DEVICE AND MANUFACTURING METHOD THEREOF

PRIORITY

This application claims priority under 35 U.S.C. § 119(a) to a Korean patent application filed on Dec. 9, 2015 in the Korean Intellectual Property Office and assigned Serial No. 10-2015-0174837, the entire disclosure of which is incorporated herein by reference.

TECHNICAL FIELD

The present disclosure relates to a continuous electric/electronic device and a method of manufacturing the same. More particularly, the present disclosure relates to a continuous electric/electronic device having a serial structure and a parallel structure and a method of manufacturing the same.

BACKGROUND ART

In case of a flexible capacitor type device, one or small number of independent devices are mostly produced and sold. It is difficult to produce the flexible capacitor type device in large quantity, and thus the flexible capacitor type device is generally custom-made according to user's request.

In the conventional method of manufacturing a flexible device, it is difficult to use a continuous process such as a roll to roll, etc. Additionally, in view of the user, certain number of flexible capacitor type devices should be connected in consideration of a use voltage and a use current, etc. required when the flexible device is used, and so it causes user's inconvenience.

Accordingly, a technique for enabling mass production of the flexible capacitor type device, ensuring of price competitiveness and development of customized device has been required.

SUMMARY

Accordingly, the invention is provided to substantially obviate one or more problems due to limitations and disadvantages of the related art. One embodiment of the invention provides a technique for developing a customized flexible capacitor type device, which can produce in large scale, with securing price competitiveness.

A method of manufacturing a continuous electric/electronic device having a serial connection structure according to one embodiment of the invention comprises: (a) disposing a first electrode current collection unit; (b) disposing first organic•inorganic material in regard to the first electrode current collection unit; (c) laminating a first area of a second electrode current collection unit on the disposed first organic•inorganic material; (d) disposing second organic•inorganic material in regard to a second area of the second electrode current collection unit; and (e) laminating a third electrode current collection unit on the disposed second organic•inorganic material. Here, the first area and the second area of the second electrode current collection unit operate as current collection units having different polarity in regard to adjoining first organic•inorganic material and second organic•inorganic material.

A method of manufacturing a continuous electric/electronic device having a parallel connection structure according to another embodiment of the invention comprises (a) disposing a lower part electrode current collection unit; (b) disposing a plurality of organic•inorganic materials in a constant space in regard to the lower part electrode current collection unit; and (c) laminating an upper part electrode current collection unit on the disposed organic•inorganic materials. Here, the lower part electrode current collection unit and the upper part electrode current collection unit operate as current collection units having different polarity in regard to the organic•inorganic materials.

A method of manufacturing a continuous electric/electronic device having a serial connection structure and a parallel connection structure according to still another embodiment of the invention comprises (a) disposing a first electrode current collection unit in a horizontal direction or a vertical direction; (b) disposing a plurality of first organic•inorganic materials in a constant space in regard to the disposed first electrode current collection unit; (c) laminating a first area of a second electrode current collection unit on the disposed first organic•inorganic materials; (d) disposing a plurality of second organic•inorganic materials in a constant space in regard to a second area of the second electrode current collection unit; and (e) laminating a third electrode current collection unit on the disposed second organic•inorganic materials. Here, the first area and the second area of the second electrode current collection unit operate as current collection units having different polarity in regard to adjoining first organic•inorganic materials and second organic•inorganic materials.

A continuous electric/electronic device having a serial connection structure and a parallel connection structure according to one embodiment of the invention comprising: a first electrode current collection unit disposed in a horizontal direction or a vertical direction; a plurality of first organic•inorganic materials disposed in a constant space in regard to the disposed first electrode current collection unit; a first area of a second electrode current collection unit laminated on the disposed first organic •inorganic materials; a plurality of second organic•inorganic materials disposed in a constant space in regard to a second area of the second electrode current collection unit; and a third electrode current collection unit laminated on the disposed second organic•inorganic materials. Here, the first area and the second area of the second electrode current collection unit operate as current collection units having different polarity in regard to the first organic•inorganic materials and the second organic•inorganic materials.

In one embodiment of the invention, a flexible device may be manufactured by using a continuous process such as a roll to roll, etc., and thus it is possible to produce in large scale and its price competitiveness may be secured.

In view of a user, a certain number of flexible capacitor type devices need not to be connected according to a use voltage and a use current, and so it is convenient to use.

The invention may be used for various processes of manufacturing the flexible capacitor type device such as a flexible dye sensitized solar cell or a flexible battery and so on.

Effect of the invention is not to effect mentioned above, and may include every effect capable of being inferred from description or claims of the invention.

BRIEF DESCRIPTION OF DRAWINGS

Example embodiments of the present invention will become more apparent by describing in detail example embodiments of the present invention with reference to the accompanying drawings, in which.

DETAILED DESCRIPTION

Example embodiments of the present invention are disclosed herein. However, specific structural and functional details disclosed herein are merely representative for purposes of describing example embodiments of the present invention, however, example embodiments of the present invention may be embodied in many alternate forms and should not be construed as limited to example embodiments of the present invention set forth herein.

Like numbers refer to like elements throughout the description of the figures.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

It will be further understood that the terms "comprises", "comprising,", "includes" and/or "including", when used herein, specify the presence of stated features, integers, steps, operations, elements, and/or configurations, but do not preclude the presence or addition of one or more other features, integers, steps, operations, elements, configurations, and/or groups thereof.

Hereinafter, embodiments of the invention will be described in detail with reference to accompanying drawings.

Figure 1:
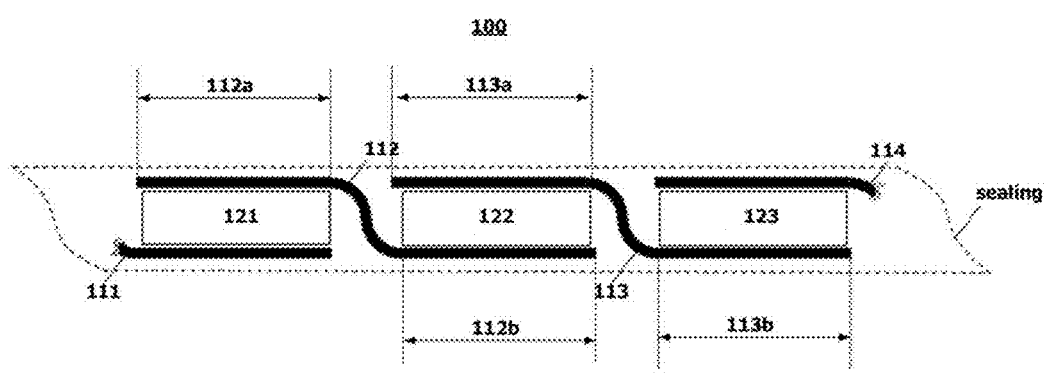
FIG. 1 is a view illustrating a continuous electric/electronic device according to one embodiment of the invention.

FIG. 1 is a view illustrating a continuous electric/electronic device according to one embodiment of the invention.

A device shown in FIG. 1 is a flexible capacitor type device (hereinafter, referred to as "serial connection device") 100 with a serial connection structure, and it may include a first electrode current collection unit 111, a second electrode current collection unit 112, a third electrode current collection unit 113, a fourth electrode current collection unit 114 and a plurality of organic•inorganic materials 121, 122 and 123.

Here, the electrode current collection units 111, 112, 113 and 114 may operate as an anode current collection unit or a cathode current collection unit of the organic•inorganic materials 121, 122 and 123 according to their arrangement. The second electrode current collection unit 112 and the third electrode current collection unit 113 may operate with different polarity on adjacent organic•inorganic materials.

Particularly, first organic•inorganic material 121 may locate between the first electrode current collection unit 111 and a part 112a of the second electrode current collection unit 112 (hereinafter, referred to as "first area") as shown in FIG. 1.

Here, in the event that the first electrode current collection unit 111 operates as an anode current collection unit, the first area 112a of the second electrode current collection unit 112 may operate as a cathode current collection unit.

Second organic•inorganic material 122 may locate between another area 112b of the second electrode current collection unit 112 (hereinafter, referred to as "second area") and a part 113a of the third electrode current collection unit 113 (hereinafter, referred to as "first area").

Here, in the event that the second area 112b of the second electrode current collection unit 112 operates as an anode current collection unit, the first area 113a of the third electrode current collection unit 113 may operate as a cathode current collection unit.

That is, the second electrode current collection unit 112 may be disposed in a stepwise shape on the adjoining first organic•inorganic material 121 and second organic •inorganic material 122 as shown in FIG. 1, and it may operate as the cathode current collection unit of the first organic•inorganic material 121 and the anode current collection unit of the second organic•inorganic material 122.

Third organic•inorganic material 123 may locate between another part 113b of the third electrode current collection unit 113 (hereinafter, referred to as "a second area") and the fourth electrode current collection unit 114. The third electrode current collection unit 113 may be disposed in a stepwise shape on the adjoining second organic •inorganic material 122 and third organic•inorganic material 123, and it may operate as a cathode current collection unit of the second organic•inorganic material 122 and an anode current collection unit of the third organic•inorganic material 123.

In another embodiment, a sealing may be performed in the serial connection device 100 as shown in FIG. 1.

Three organic•inorganic materials 121, 122 and 123 are connected in serial in FIG. 1. However, a number of organic•inorganic material connected in serial is not limited. For example, four or more organic•inorganic materials may be connected in serial.

Figure 2:
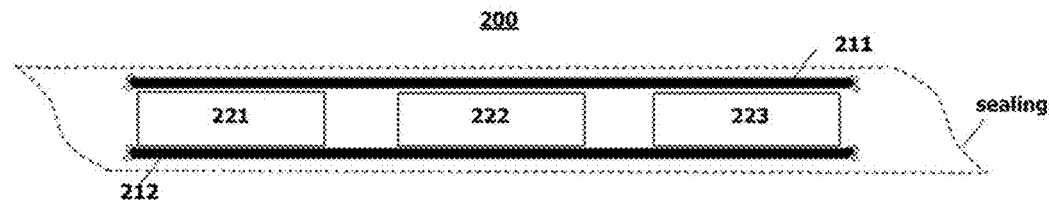
FIG. 2 is a view illustrating a continuous electric/electronic device according to another embodiment of the invention.

FIG. 2 is a view illustrating a continuous electric/electronic device according to another embodiment of the invention.

A device shown in FIG. 2 is a flexible capacitor type device 200 (hereinafter, referred to as "parallel connection device") having a parallel connection structure. The flexible capacitor type device 200 may include an upper part electrode current collection unit 211, a lower part electrode current collection unit 212 and a plurality of organic•inorganic materials 221, 222 and 223.

Here, the electrode current collection units 211 and 212 may operate as an anode current collection unit or a cathode current collection unit of the organic•inorganic materials 221, 222 and 223 according to a location at which the electrode current collection units 211 and 212 are disposed.

Particularly, as shown in FIG. 2, the organic•inorganic materials 221, 222 and 223 may be disposed in a certain space between the upper part electrode current collection unit 211 and the lower part electrode current collection unit 212, respectively. The upper part electrode current collection unit 211 and the lower part electrode current collection unit 212 may operate as the cathode current collection unit and the anode current collection unit in regard to the organic•inorganic materials 221, 222 and 223, respectively.

In one embodiment, a sealing may be performed in the parallel connection device 200 as shown in FIG. 2.

In FIG. 2, three organic•inorganic materials 221, 222 and 223 are sequentially connected in parallel for convenience of description. However, the number of organic•inorganic materials connected in parallel may increase.

Figure 3:
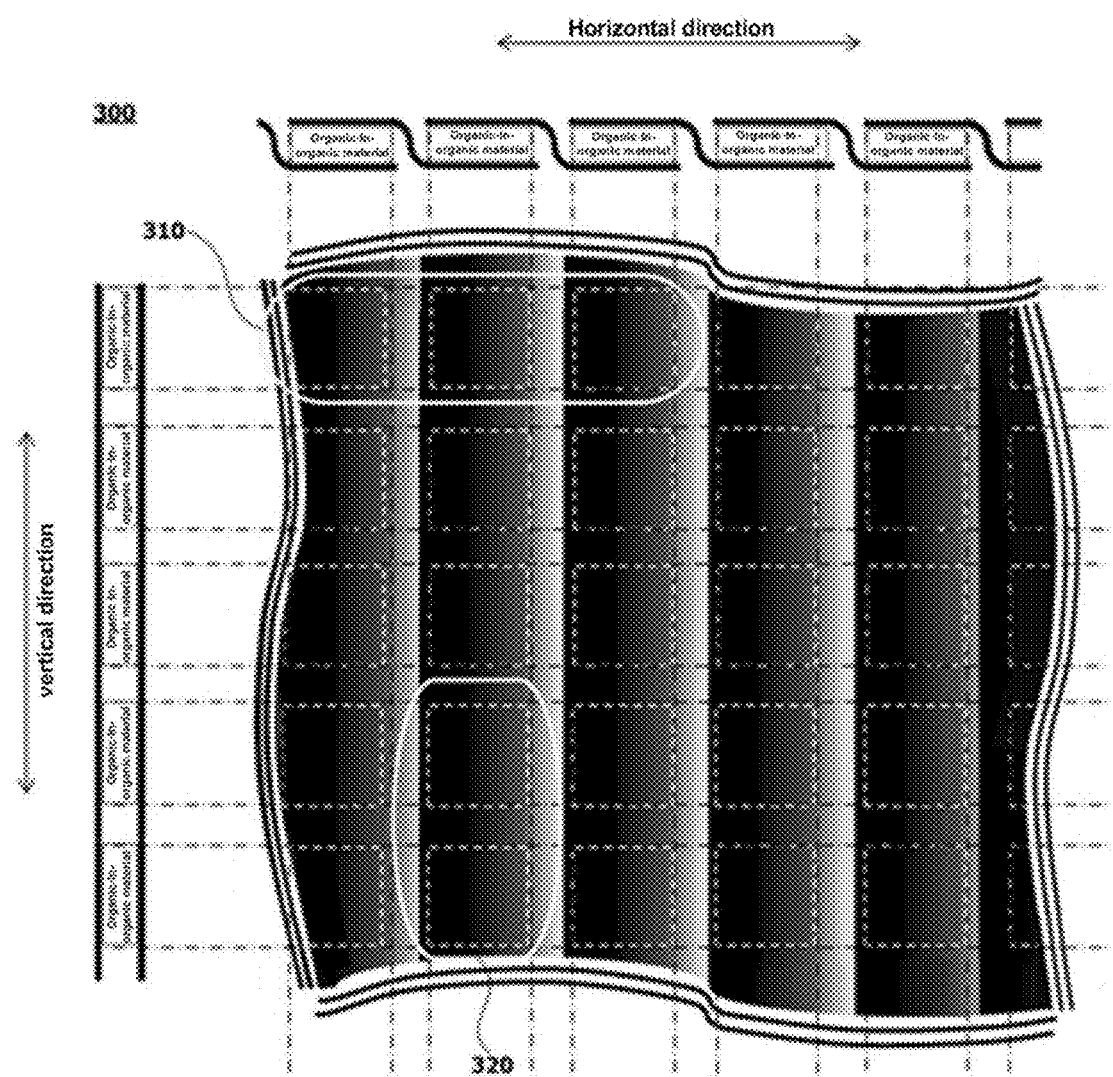
FIG. 3 is a view illustrating a continuous electric/electronic device according to still another embodiment of the invention.

FIG. 3 is a view illustrating a continuous electric/electronic device according to still another embodiment of the invention.

A device in FIG. 3 is a device 300 (hereinafter, referred to as "serial•parallel device") having serial/parallel connection structure which corresponds to combination of the serial connection device 100 in FIG. 1 and the parallel connection device 200 in FIG. 2. If the serial•parallel connection device 300 is used as a flexible capacitor type device, the flexible capacitor type device using a film or a textile fabric, etc. may be produced in large scale A-A' section of the serial•parallel device 300 may illustrate a structure of the serial connection device 100, and B-B' section may show a structure of the parallel connection device 200.

That is, organic•inorganic materials in a horizontal direction may form the serial connection device 100, and organic•inorganic materials in a vertical direction may form the parallel connection device 200.

A user may divide necessary number of the serial connection devices 310 including organic•inorganic materials connected in serial from the serial•parallel connection device 300 according to a voltage or current required for working and use the divided serial connection device 310 and use the divided serial connection devices 310, without connecting extra devices. The user may divide necessary number of the parallel connection devices 320 including organic•inorganic materials connected in parallel from the serial•parallel connection device 300 according to the voltage or the current required for working and use the divided parallel connection devices 320, without connecting extra devices.

Hereinafter, methods of manufacturing the serial connection device 100, the parallel connection device 200 and the serial•parallel device 300 will be described in detail with reference to accompanying drawings FIG. 4 to FIG. 6.

Figure 4:
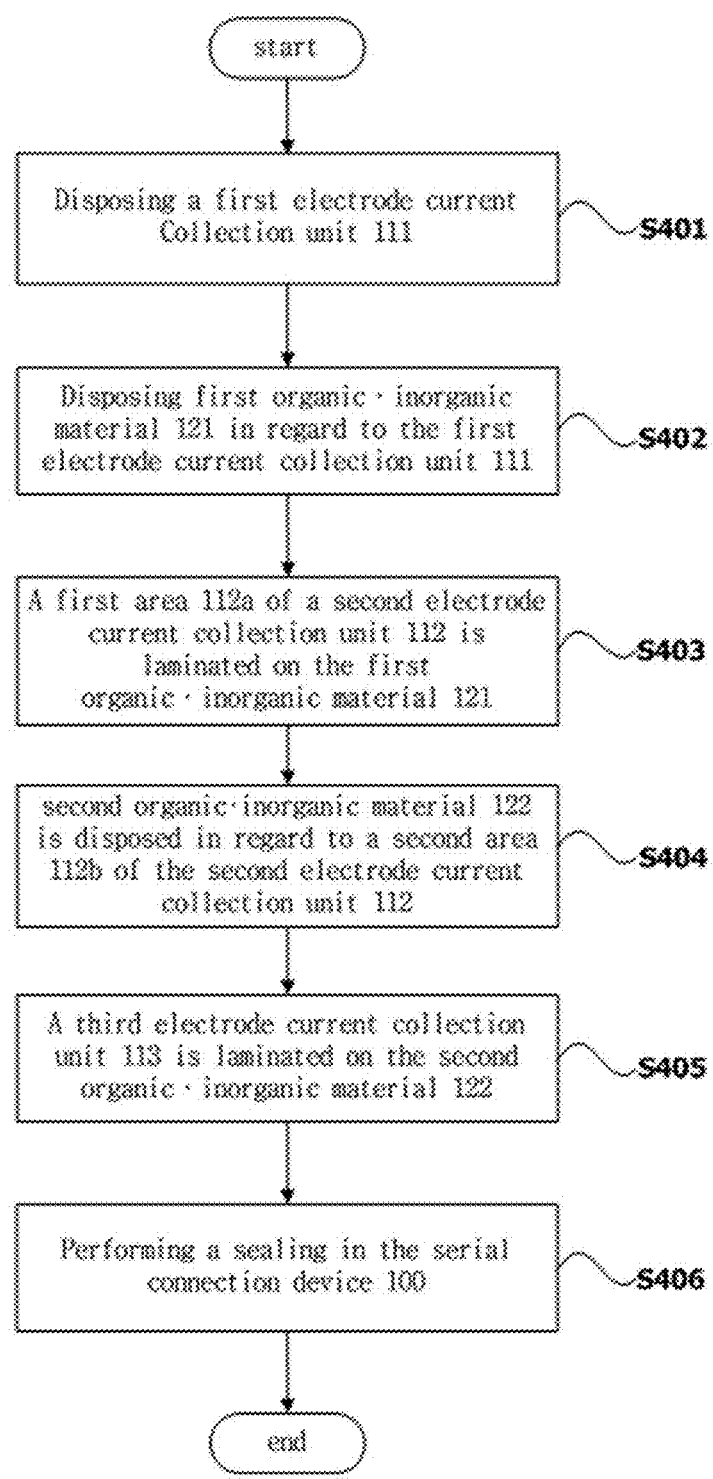
FIG. 4 is a flowchart illustrating a method of manufacturing a continuous electric/electronic device according to one embodiment of the invention.

FIG. 4 is a flowchart illustrating a method of manufacturing a continuous electric/electronic device according to one embodiment of the invention.

FIG. 4 illustrates the flowchart of the method of manufacturing the serial connection device 100 in FIG. 1. For convenience of description, it is assumed that two organic•inorganic materials are connected in a constant space in serial.

In a step of S401, a first electrode current collection unit 111 is disposed.

In a step of S402, first organic•inorganic material 121 is disposed in regard to the first electrode current collection unit 111.

Here, the first electrode current collection unit 111 may operate as the anode current collection unit of the first organic•inorganic material 121.

In a step of S403, a first area 112a of a second electrode current collection unit 112 is laminated on the disposed first organic•inorganic material 121.

Here, it is desirable that the first area 112a of the second electrode current collection unit 112 has an area covering a whole of the upper part of the first organic•inorganic material 121. The first area 112a may operate as the cathode current collection unit of the first organic•inorganic material 121.

In a step of S404, second organic•inorganic material 122 is disposed in regard to a second area 112b of the second electrode current collection unit 112.

Here, it is desirable that the second area 112b of the second electrode current collection unit 112 has an area covering a whole of a lower part of the second organic•inorganic material 122.

That is, the second electrode current collection unit 112 may be disposed in a stepwise shape on adjoining first organic•inorganic material 121 and second organic•inorganic material 122. As a result, the second electrode current collection unit 112 may operate as the cathode current collection unit of the first organic•inorganic material 121 and the anode current collection unit of the second organic•inorganic material 122.

In a step of S405, a third electrode current collection unit 113 is laminated on the second organic•inorganic material 122.

In a step of S406, a sealing is performed in the serial connection device 100.

Figure 5:
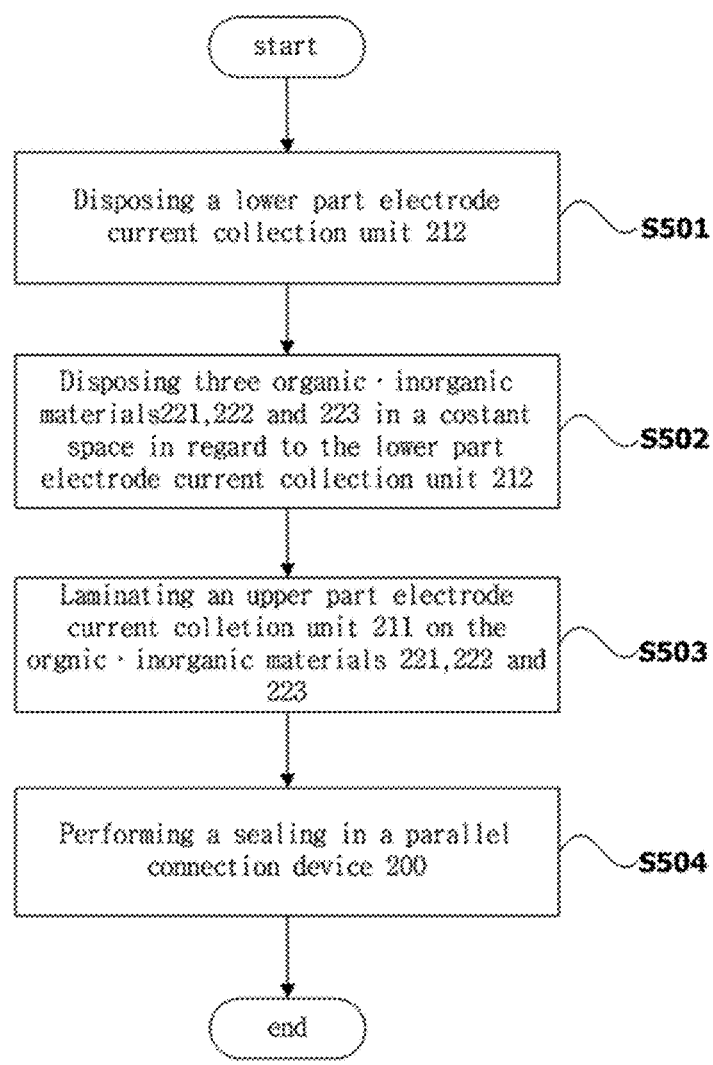
FIG. 5 is a view illustrating a method of manufacturing a continuous electric/electronic device according to another embodiment of the invention.

FIG. 5 is a view illustrating a method of manufacturing a continuous electric/electronic device according to another embodiment of the invention.

FIG. 5 shows the flowchart of the method of manufacturing the parallel connection device 200 in FIG. 2. For convenience of description, it is assumed that three organic•inorganic materials are connected in a constant space in parallel.

In a step of S501, a lower part electrode current collection unit 212 is disposed.

In a step of S502, three organic•inorganic materials 221, 222 and 223 are disposed in a constant space in regard to the lower part electrode current collection unit 212.

In a step of S503, an upper part electrode current collection unit 211 is laminated on the three organic•inorganic materials 221, 222 and 223.

Here, the lower part electrode current collection unit 212 may operate as an anode current collection unit of the three organic•inorganic materials 221, 222 and 223. The upper part electrode current collection unit 211 may operate as a cathode current collection unit of the three organic•inorganic materials 221, 222 and 223.

In a step of S504, a sealing is performed in the parallel connection device 200.

Figure 6:
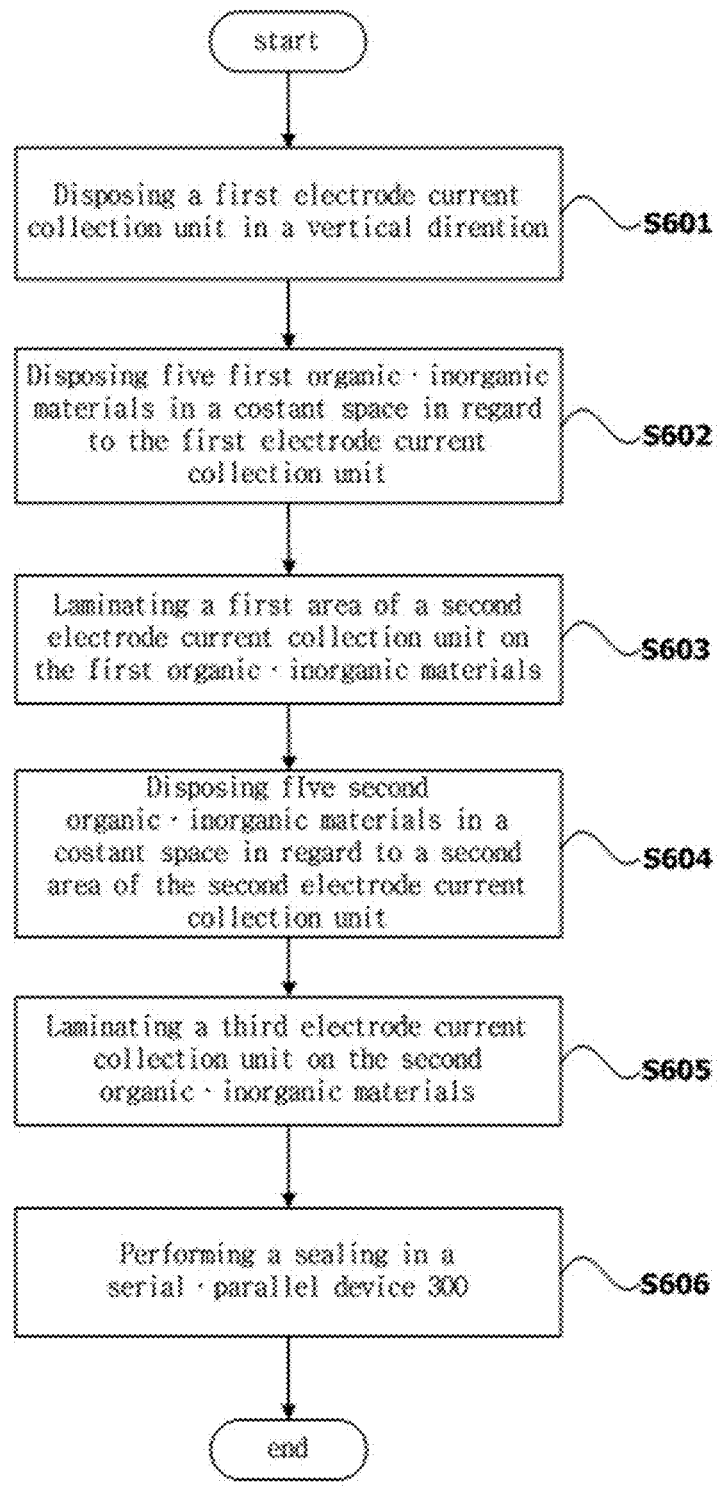
FIG. 6 is a flowchart illustrating a method of manufacturing a continuous electric/electronic device according to still another embodiment of the invention.

FIG. 6 is a flowchart illustrating a method of manufacturing a continuous electric/electronic device according to still another embodiment of the invention.

FIG. 6 illustrates the flowchart of the method of manufacturing the serial-parallel connection device 300 in FIG. 3. For convenience of description, it is assumed that five organic•inorganic materials are disposed in a constant space in parallel and two organic•inorganic materials are disposed in a constant space in serial.

In a step of S601, a first electrode current collection unit is disposed in a vertical direction.

In a step of S602, five first organic•inorganic materials are disposed in a constant space in regard to the disposed first electrode current collection unit.

Here, the first electrode current collection unit may operate as an anode current collection unit of the five first organic•inorganic materials.

In a step of S603, a first area of a second electrode current collection unit is laminated on the five first organic•inorganic materials.

Here, it is desirable that the first area of the second electrode current collection unit has an area covering a whole of an upper part of the first organic•inorganic materials. The first area of the second electrode current collection unit may operate as the cathode current collection unit of the first organic•inorganic materials.

In a step of S604, five second organic•inorganic materials are disposed in a constant space in regard to a second area of the second electrode current collection unit.

Here, it is desirable that the second area of the second electrode current collection unit has an area covering a whole of a lower part of the second organic•inorganic materials. The second area of the second electrode current collection unit may operate as the anode current collection unit of the second organic•inorganic materials.

Accordingly, the second electrode current collection unit is disposed in a stepwise shape in regard to adjoining first organic•inorganic materials and second organic•inorganic materials. The second electrode current collection unit may operate as a cathode current collection unit of the first organic•inorganic materials and an anode current collection unit of the second organic•inorganic materials.

In a step of S605, a third electrode current collection unit is laminated on the five second organic•inorganic materials.

Here, the third electrode current collection unit may operate the cathode current collection unit of the five second organic•inorganic materials.

In the event that the process in FIG. 6 is used when a flexible dye-sensitized solar cell is manufactured, a counter electrode and a gel electrolyte may be used as the first organic•inorganic material and the second organic•inorganic material. A photo electrode and a dye may be disposed on the cathode current collection unit.

In an embodiment where the photo electrode and the dye are disposed on the cathode current collection unit, the photo electrode and the dye may be disposed on the cathode current collection unit after every step before the sealing is completed.

In another embodiment, an electrode current collection unit may be laminated on the organic•inorganic material and then the photo electrode and the dye may be disposed on the electrode current collection unit.

That is, the photo electrode and the dye may be disposed after the steps S603 and S605.

In a step of S606, a sealing is performed in the serial•parallel connection device 300.

Figure 7:
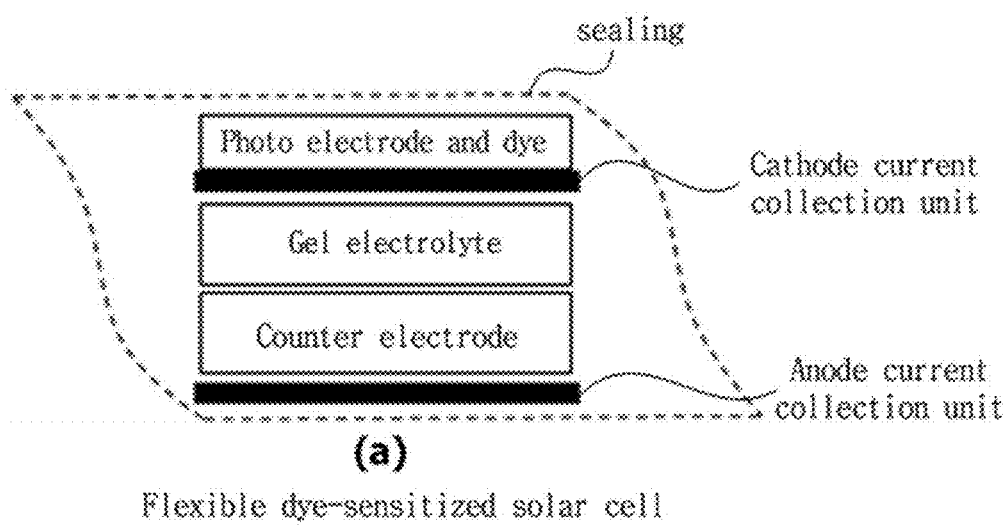
FIG. 7 is a view illustrating a flexible capacitor type device using the method of manufacturing the continuous electric/electronic device according to one embodiment of the invention.
Figure 7:
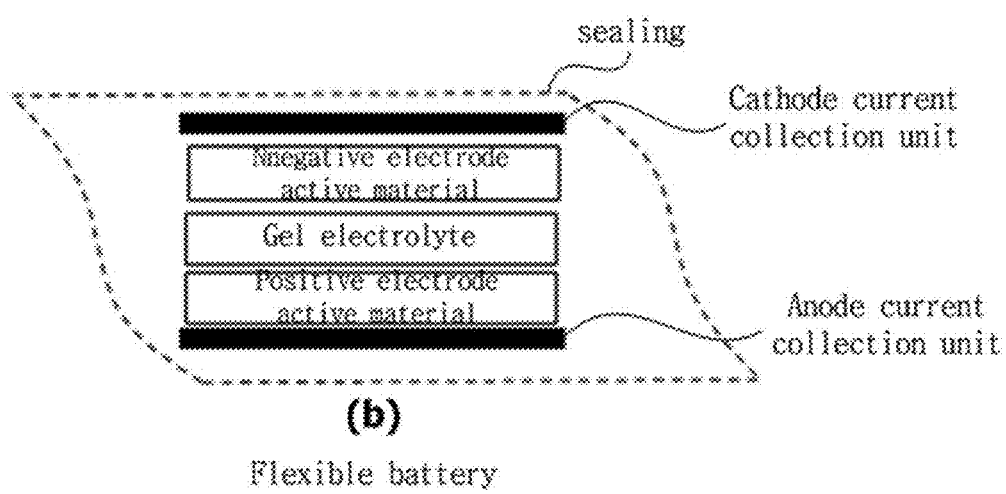

FIG. 7 is a view illustrating a flexible capacitor type device using the method of manufacturing the continuous electric/electronic device according to one embodiment of the invention.

(a) in FIG. 7 illustrates a case that the process of the invention is applied to a process of manufacturing a flexible dye-sensitized solar cell. A counter electrode and a gel electrolyte may be disposed between an anode current collection unit and a cathode current collection unit, and a photo electrode and a dye may be disposed on the cathode current collection unit.

(b) in FIG. 7 shows a case that the process of the invention is applied to a process of manufacturing a flexible battery. A positive electrode active material, a negative electrode active material and a gel electrolyte may be disposed between the anode current collection unit and the cathode current collection unit.

Although embodiments have been described with reference to a number of illustrative embodiments thereof, it should be understood that numerous other modifications and embodiments can be devised by those skilled in the art that will fall within the spirit and scope of the principles of this disclosure.

The embodiments of the invention described above are disclosed only for illustrative purposes, and are not limited.

Various variations and modifications are possible in the configuration parts and/or arrangements of the subject combination arrangement within the scope of the disclosure, the drawings and the appended claims.

A person having ordinary skill in the art would be able to make various modifications, alterations, and additions without departing from the spirit and scope of the invention, but it is to be appreciated that such modifications, alterations, and additions are encompassed by the scope of claims set forth below.

The invention claimed is:

1. A method of manufacturing a continuous electric/electronic device having a serial connection structure and a parallel connection structure, the method comprising:
(a) disposing a first electrode current collection unit in a first longitudinal direction;
(b) disposing a plurality of first organic•inorganic materials in a constant space on the disposed first electrode current collection unit;
(c) laminating a first area of a second electrode current collection unit on the disposed first organic•inorganic materials;
(d) disposing a plurality of second organic•inorganic materials in a constant space on a second area of the second electrode current collection unit, the plurality of second organic•inorganic materials being disposed apart from the plurality of first organic•inorganic materials by a predetermined distance and arranged in the first longitudinal direction; and
(e) laminating a third electrode current collection unit on the disposed second organic•inorganic materials,
wherein the first area and the second area of the second electrode current collection unit operate as current collection units having different polarity in regard to adjoining the plurality of first organic•inorganic materials and the plurality of second organic•inorganic materials,
wherein each of the plurality of the first and second organic•inorganic materials disposed in the first longitudinal direction constitutes a parallel connection structure,
wherein the plurality of the first and second organic•inorganic materials are disposed side by side in a direction perpendicular to the first longitudinal direction and constitute a serial connection structure.

2. The method of claim 1, wherein
the first electrode current collection unit operates as an anode current collection unit of the first organic•inorganic materials,
the first area of the second electrode current collection unit operates as a cathode current collection unit of the first organic•inorganic materials,
the second area of the second electrode current collection unit operates as an anode current collection unit of the second organic•inorganic materials, and
the third electrode current collection unit operates as a cathode current collection unit of the second organic•inorganic materials.

3. The method of claim 1, further comprising:
(f) performing a sealing.

4. The method of claim 2, further comprising:
(f) laminating a photo electrode and a dye on the first area of the second electrode current collection unit which is the cathode current collection unit and the third electrode current collection unit,
wherein the first organic•inorganic material and the second organic•inorganic material include a counter electrode and a gel electrolyte.

5. The method of claim 2,
wherein
the step (c) includes laminating a photo electrode and a dye on the first area of the second electrode current collection unit which is the cathode current collection unit, and
the step (e) includes laminating a photo electrode and a dye on the third electrode current collection unit, and
wherein the first organic•inorganic material and the second organic•inorganic material include a counter electrode and a gel electrolyte.

6. The method of claim 1, wherein the first organic•inorganic material and the second organic•inorganic material include at least one of a positive electrode active material, a gel electrolyte or a negative electrode active material.

* * * * *